United States Patent [19]

Ogawa

[11] Patent Number: 5,528,941

[45] Date of Patent: Jun. 25, 1996

[54] DIFFERENTIAL PRESSURE SENSOR CONNECTOR FOR FUEL TANK

[75] Inventor: Shinji Ogawa, Yokkaichi, Japan

[73] Assignee: Sumitomo Wiring Systems, Ltd., Japan

[21] Appl. No.: 221,763

[22] Filed: Apr. 1, 1994

[30] Foreign Application Priority Data

Apr. 14, 1993 [JP] Japan .................. 5-024922 U

[51] Int. Cl.⁶ ........................ G01L 13/00
[52] U.S. Cl. ..................... 73/756; 73/301
[58] Field of Search .............. 73/756, 291, 299, 73/301

[56] References Cited

U.S. PATENT DOCUMENTS

| | | | |
|---|---|---|---|
| 1,413,235 | 4/1922 | Novick et al. | 73/299 |
| 4,928,530 | 5/1990 | Lehto et al. | 73/756 |
| 5,070,732 | 12/1991 | Duncan et al. | 73/756 X |
| 5,341,684 | 8/1994 | Adams et al. | 73/756 |

FOREIGN PATENT DOCUMENTS

| | | | |
|---|---|---|---|
| 211577 | 9/1988 | Japan | H01R 9/16 |
| 325316 | 11/1992 | Japan | B60K 15/03 |

*Primary Examiner*—Kenneth A. Wieder
*Assistant Examiner*—Joseph L. Felber
*Attorney, Agent, or Firm*—Jordan B. Bierman; Bierman and Muserlian

[57] ABSTRACT

This invention aims to efficiently assemble a pressure sensor 10 to a connector for a fuel tank. A connector adapted to be connected to electrical devices for the fuel tank is attached to a base plate 1 which closes an opening in the tank. A connector housing 4 is provided with an accommodating chamber 11 in which the pressure sensor 10 is secured. It is possible to assure to provide a space for a pressure sensor 10 in an existing connector, to prevent an increase in the number of connectors, and to decrease costs.

1 Claim, 5 Drawing Sheets

5,528,941

DIFFERENTIAL PRESSURE SENSOR CONNECTOR FOR FUEL TANK

BACKGROUND OF THE INVENTION

1. Field of the Invention

This invention relates to a connector for a fuel tank and more particularly, to a connector which is secured to a tank body of the fuel tank to electrically interconnect elements inside and outside the tank.

2. Statement of the Prior Art

A fuel tank in an automobile is provided in its interior with various electrical devices such as a fuel pump, a fuel gauge and the like. An example of means for interconnecting the electrical devices and an external power source is known, for example, by the Japanese Patent Public Disclosure No. 63-211577 (1988). The above means include a base plate for closing an opening in a wall of the fuel tank, a connector fitted and sealed to the base plate, and terminals in the connector for electrically interconnecting the elements inside and outside the tank.

Recently, regulations governing fuel emissions have been strengthened, necessitating the need for means for detecting an internal pressure in a fuel tank. Consequently, a connector for a pressure sensor is required in an automobile.

For convenience of explanation a typical conventional connector for a pressure sensor is described below by referring to FIG. 7. FIG. 7 is a cross sectional view of the conventional pressure sensor connector. The pressure sensor connector, as shown in the drawing, includes a lower detecting part 30 which projects in the fuel tank 40, an upper connecting part 31, and screw-receiving parts 32 provided on opposite sides of the connecting part 31. In the case of attaching the connector to a base plate 1 of a fuel tank 40, two connectors including an existing connector are arranged on the base plate 1.

However, if two connectors are attached to the base plate separately, the number of parts increases thus raising costs. Since pipes for supplying and returning fuel to and from the fuel tank and other parts are arranged on the base plate, it is not easy to assure the provision of a space for a pressure sensor connector on the base plate.

SUMMARY OF THE INVENTION

An object of the present invention is to provide a connector for a fuel tank in which a pressure sensor can be efficiently secured.

In order to achieve the above object, a connector for a fuel tank wherein the connector is attached to a base plate mounted on a fuel tank body and adapted to be connected to electrical devices for the fuel tank, comprises: a connector housing having an accommodating chamber; and a pressure sensor secured in said accommodating chamber for detecting an internal pressure in said fuel tank.

Since the accommodating chamber is provided in the connector housing, a connector containing the pressure sensor can be obtained merely by inserting the pressure sensor into the accommodating chamber.

According to the present invention, since the pressure sensor can be secured to the existing connector, it is not necessary to provide a special space for the pressure sensor connector thereby preventing an increase in the number of connectors.

DETAILED DESCRIPTION OF THE PREFERRED EMBODIMENTS

Figure 1:
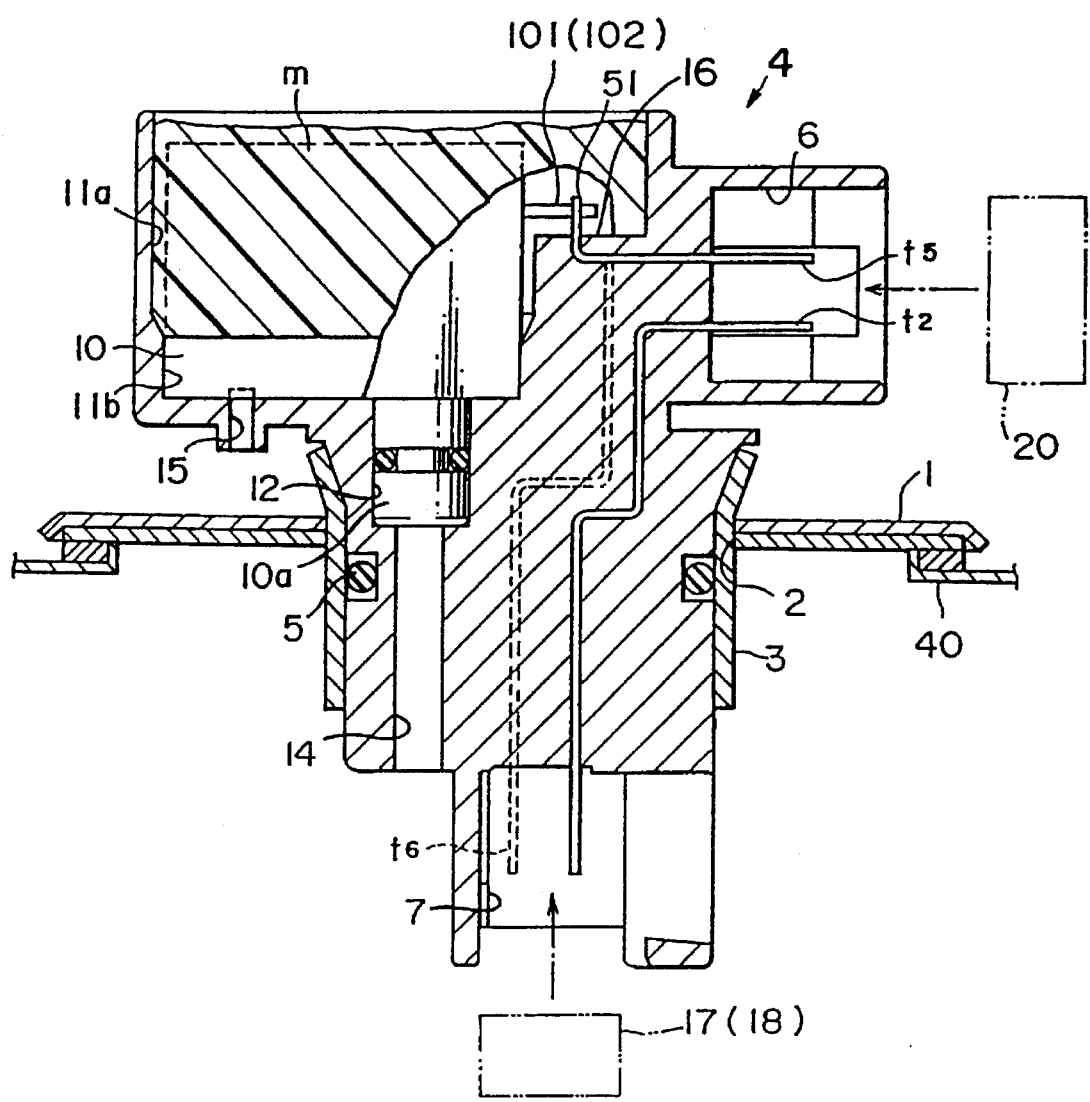
FIG. 1 is a longitudinal sectional view of a connector for a fuel tank of the present invention, illustrating the connector in an attached position.

Embodiments of a connector for a fuel tank of the present invention will be explained by referring to FIGS. 1 to 6. FIG. 1 shows a connector for a fuel tank (fuel tank connector) which is mounted on a base plate 1 of a fuel tank 40 in an automobile. The base plate 1 serves to close an opening in the fuel tank 40 and is provided with a connector-attaching hole 2. A metal sleeve 3 is fitted in the hole 2 and secured thereto by welding or the like. A connector housing 4 is sealingly fitted in the sleeve 3 through an O ring 5. The connector housing 4 is made of a synthetic resin material and is provided on an upper side face and a lower end face with an upper connecting port 6 and a lower connecting port 7, which serves to receive another connectors.

Figure 2:
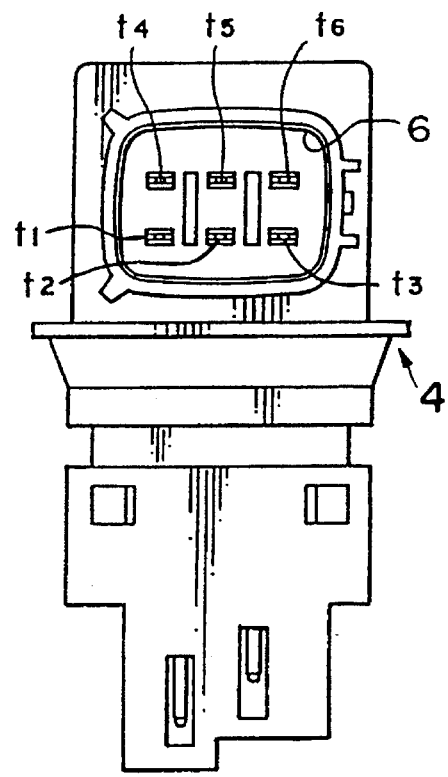
FIG. 2 is a front view of the fuel tank connector.
Figure 4:
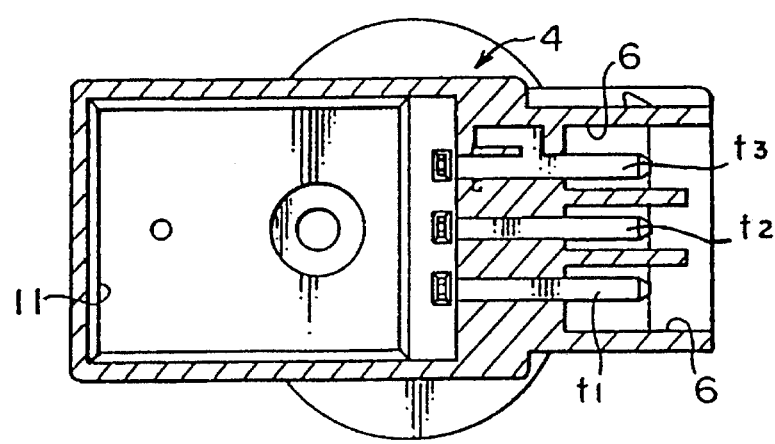
FIG. 4 is a cross sectional view taken along lines IV—IV in FIG. 3.

A plurality of terminals t1 to t6 are embedded in the connector housing 4 by a manner of insert-forming. In this embodiment, the terminals t1 to t6 are electrically connected to a fuel pump 8, a fuel gauge 9 (see FIG. 6), a pressure sensor 10, and an external power source respectively. The terminals are juxtaposed on upper and lower stages in the upper connecting port 6, as shown in FIG. 2. The plus terminal t1 for the pump 8, ground terminal t2 for the pump 8, and plus terminal t3 for the fuel gauge 9 are arranged from the left side to the right side in order at the lower stage while the input terminal t4 and output terminal t5 for the pressure sensor 10, and ground terminal t6 for the fuel gauge 9 are arranged from the left side to the right side in order at the upper stage (common ground terminals t2 and t6 will be explained hereinafter).

Figure 5:
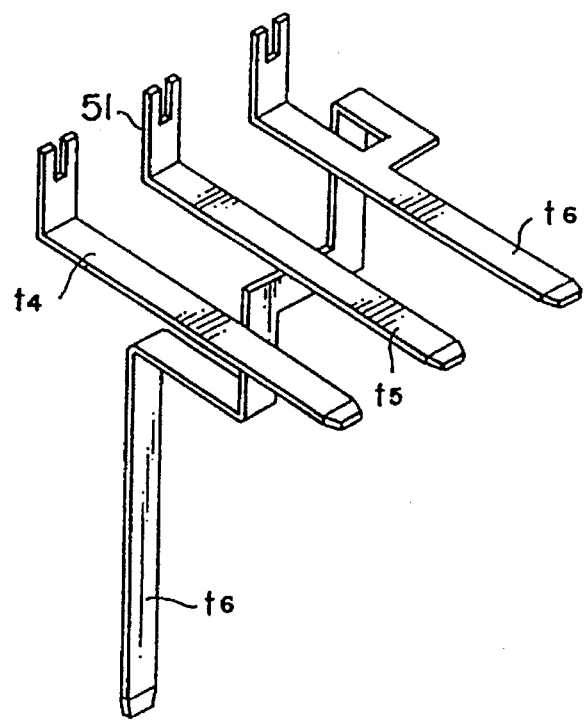
FIG. 5 is a perspective view of terminals to be used in an upper stage in the fuel tank connector of the present invention.

In FIG. 2, the terminals arranged at the lower stage are bent in a step like shape and projected in the connecting ports 6 and 7 (see FIG. 1) while the terminals arranged at the upper stage, except for the right side terminal in FIG. 2, are bent upwardly at their rear ends 51 adapted to be connected to terminals 101 and 102 of the pressure sensor 10. However, as shown in FIG. 5, in order to make the right side terminal t6 a common ground terminal for the pressure sensor 10 and fuel gauge 9, the terminal t6 is branched at a portion extending to an accommodating chamber 11 for a pressure sensor in the same manner as the upper stage terminal. A branched portion of the terminal t6 extends downwardly and projects in the lower connecting port 7.

Figure 6:
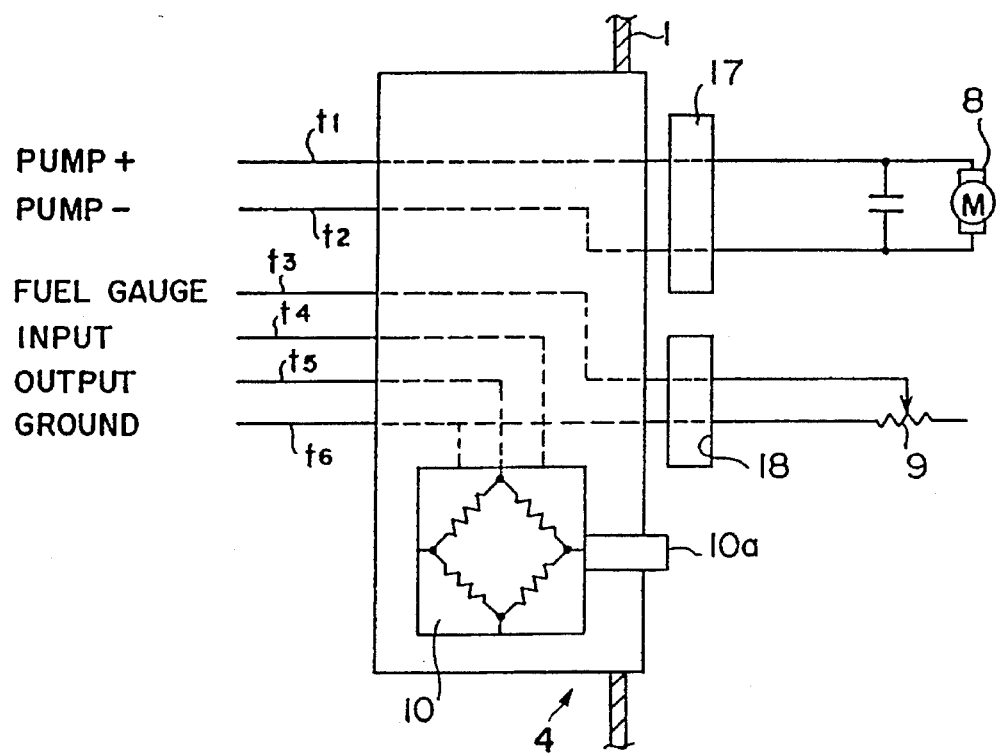
FIG. 6 is an electrical circuit diagram of the fuel tank connector of the present invention.
Figure 7:
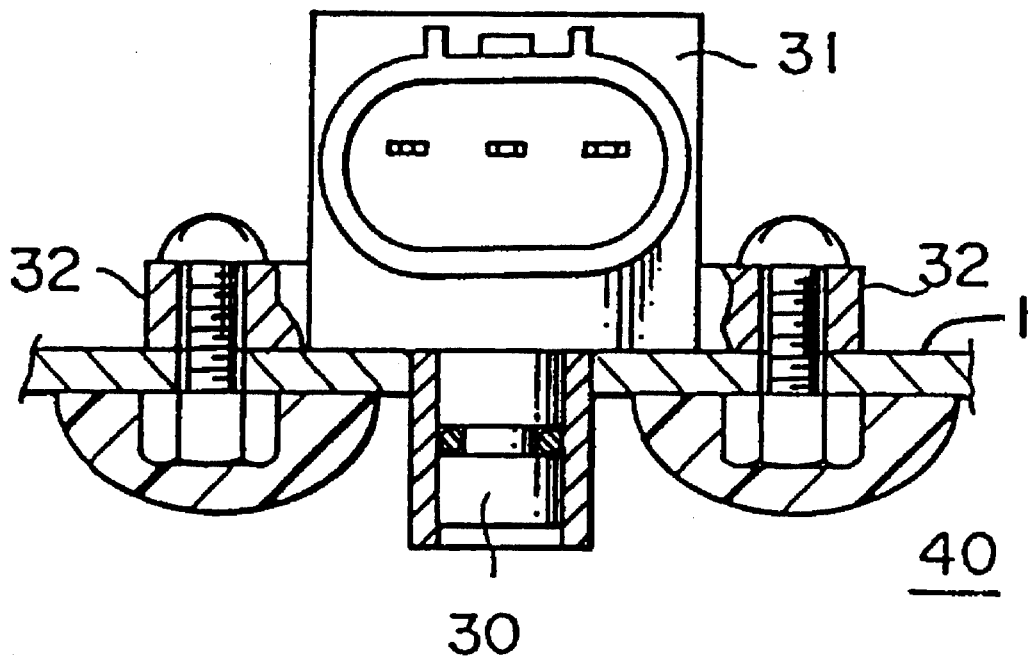
FIG. 7 is a cross sectional view of a conventional connector for a pressure sensor.

Each terminal projecting in the lower connecting port 7 is connected to the corresponding fuel pump 8 or the fuel gauge 9 through a connector 17 or 18 (FIG. 6).

The pressure sensor 10 is embedded in an upper portion of the connector housing 4 and behind the upper connecting port 6. The pressure sensor 10 is formed into a box like shape and provided on its front face with the input and output terminal 101 and the ground terminal 102. The terminals 101 and 102 are connected to the above-mentioned terminals t4 and t5 at the upper stage. Further, the pressure sensor 10 is provided on the bottom face with a pressure detecting part 10a extending downwardly.

On the other hand, the accommodating chamber 11 for receiving the pressure sensor 10 is formed in an upper portion of the connector housing 4 to define an upward open rectangular opening. A larger diameter passage 12 for receiving the detecting part 10a of the pressure sensor 10 is formed in a bottom wall of the connector housing 4. A smaller diameter passage 14 for introducing the internal pressure in the fuel tank 40 to the detecting part 10a of the pressure sensor 10 is formed in the bottom wall to extend from a lower end of the large diameter passage 12 to a lower face of the bottom wall. The smaller diameter passage 14 is communicated at its lower end to the fuel tank 40 and adjoined to the lower connecting port 7. Accommodating chamber 11 has port 15 in its bottom wall. Since sensor 10 is a differential pressure type sensor, it detects atmospheric pressure.

Figure 3:
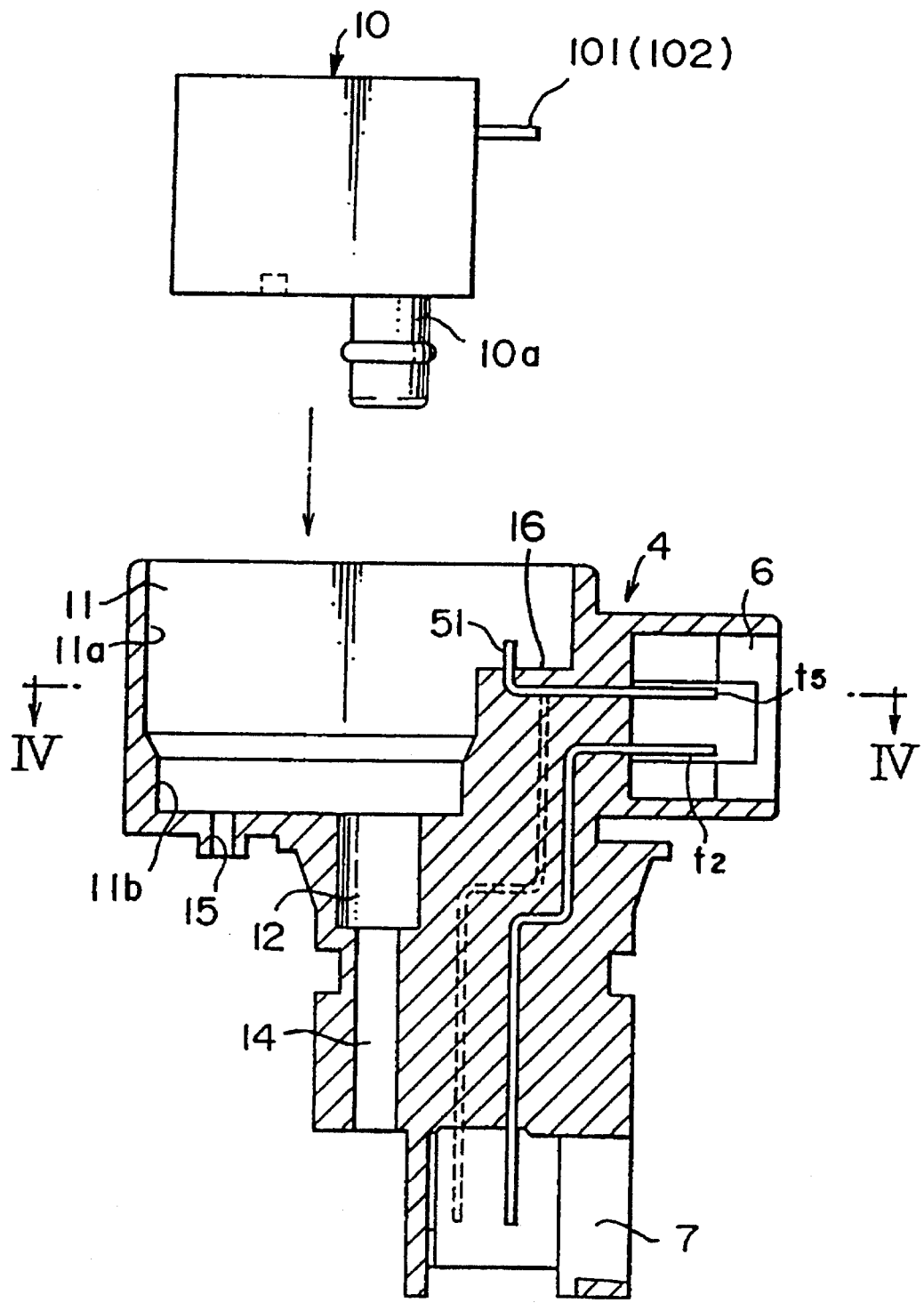
FIG. 3 is a longitudinal sectional view of the fuel tank connector of the present invention, illustrating a pressure sensor prior to being attached to a connector housing.

Also, the accommodating chamber 11 has a stepped part 16 for receiving terminals 101 and 102 of the pressure sensor 10 and an upper larger part 11a for receiving a sensor body, as shown in FIG. 3. The upper larger part 11a has a depth sufficient to sink a top face of the pressure sensor 10 below a top face of the connector housing. An epoxide resin material m (FIG. 1) is filled in a clearance between the pressure sensor 10 and the upper larger part 11a of the accommodating chamber 11. On the contrary, a lower smaller part 11b below the upper larger part 11a is not filled with the epoxy resin material m since a lower edge of the pressure sensor 10 closely contacts with an upper edge of the lower smaller part 11b.

In order to electrically interconnect the elements inside and outside the fuel tank 40, the respective terminals in the lower connecting port 7 are connected to the corresponding fuel pump 8 and fuel gauge 9 through the respective connectors 17 and 18 (FIGS. 1 and 6). On the other hand, the respective terminals in the upper connecting port 6 are connected through a connector 20 (FIG. 1) to a signal processing device (a computer for an automobile) which processes signals from the external power source and pressure sensor 10. Consequently, an electrical connection among the fuel pump 8, the fuel gauge 9, and the pressure sensor 10 inside and outside the fuel tank 40 is finished.

Therefore, according to the fuel tank connector of the present invention, it is not necessary to provide a special space for the pressure sensor 10, since the pressure sensor 10 is assembled in the existing fuel tank connector. It is possible to realize an efficient arrangement on the base plate 1, thereby enhancing a flexibility of arrangement on the base plate 1. Since no connector is required for only the pressure sensor 10, a cost is lowered and handling of the connector becomes easier. Further, since the ground terminal is common to the ground terminals of the pressure sensor 10 and fuel gauge 9, the number of terminals can be decreased to be one. Accordingly, a space for assembling connectors becomes small and the cost is lowered.

What is claimed is:

1. A connector for a fuel tank, said connector attached to a base plate mounted on a fuel tank body and adapted for connection to at least one electrical device for said fuel tank, said connector comprising a connector housing having an accommodating chamber in an upper portion of said connector housing, thereby defining an upwardly open opening, a larger diameter passage adapted to receive a detecting part of a pressure sensor in a bottom wall of said connector housing, said pressure sensor adapted to detect internal pressure in said fuel tank, a smaller diameter passage in said bottom wall, connecting said internal pressure to said detecting part and extending from a lower end of said larger diameter passage to a lower face of said bottom wall;

a port in said bottom wall for detecting atmospheric pressure, said accommodating chamber having a stepped part adapted to receive terminals of said pressure sensor and an upper larger part for receiving a pressure sensor body, said larger part having a depth such that a top face of said sensor body is below a top face of said connector housing, there being resin in a clearance between said pressure sensor body, said stepped part, and said upper larger part.

\* \* \* \* \*